(12) United States Patent
Dong et al.

(10) Patent No.: US 11,347,588 B2
(45) Date of Patent: May 31, 2022

(54) METHOD, ELECTRONIC DEVICE AND COMPUTER PROGRAM PRODUCT FOR DATA PROCESSING

(71) Applicant: EMC IP Holding Company LLC, Hopkinton, MA (US)

(72) Inventors: Hailan Dong, Chengdu (CN); Xu Chen, Chengdu (CN); Changxu Jiang, Chengdu (CN); Zhenzong Jiang, Chengdu (CN); Peilei Chen, Chengdu (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/998,269

(22) Filed: Aug. 20, 2020

(65) Prior Publication Data

US 2021/0191817 A1    Jun. 24, 2021

(30) Foreign Application Priority Data

Dec. 24, 2019   (CN) .......................... 201911349473.1

(51) Int. Cl.
```
G06F 11/32      (2006.01)
G06F 11/10      (2006.01)
G06F 11/30      (2006.01)
G06F 11/07      (2006.01)
```
(52) U.S. Cl.
CPC ...... *G06F 11/1088* (2013.01); *G06F 11/0772* (2013.01); *G06F 11/1084* (2013.01); *G06F 11/3034* (2013.01); *G06F 11/325* (2013.01); *G06F 11/328* (2013.01)

(58) Field of Classification Search
CPC ............. G06F 11/0772; G06F 11/1084; G06F 11/1088
USPC ................................................. 714/6.22, 57
See application file for complete search history.

(56) References Cited

U.S. PATENT DOCUMENTS

| 8,103,801 | B1* | 1/2012 | Sardella ............... G06F 11/325 710/1 |
| 10,631,430 | B2 | 4/2020 | Zhai et al. |
| 10,877,945 | B1 | 12/2020 | Mandic et al. |
| 10,896,152 | B2 | 1/2021 | Kuang et al. |
| 10,929,243 | B2 | 2/2021 | Creed et al. |
| 10,983,874 | B2 | 4/2021 | Kang et al. |
| 2003/0046461 | A1* | 3/2003 | Sivertsen .............. G06F 3/0658 710/74 |
| 2003/0046470 | A1* | 3/2003 | Sivertsen .............. G06F 3/0658 710/304 |

(Continued)

FOREIGN PATENT DOCUMENTS

CN            101345062 A   *  1/2009

*Primary Examiner* — Chae M Ko
(74) *Attorney, Agent, or Firm* — BainwoodHuang

(57) ABSTRACT

Techniques for data processing involve: determining, from a disk array, a target disk used for data reconstruction of the disk array; and sending, to an indicating apparatus associated with the target disk, an indication that the target disk is used for the data reconstruction. In this way, such techniques can indicate to the user that the target disk is being used for data reconstruction to remind the user not to remove or move the target disk, thereby ensuring completion of the data reconstruction. Such a technique may improve data storage equipment operation by preventing user interference.

11 Claims, 4 Drawing Sheets

(56) References Cited

U.S. PATENT DOCUMENTS

| | | | |
|---|---|---|---|
| 2009/0129228 A1* | 5/2009 | Wu | G06F 11/321 |
| | | | 369/53.42 |
| 2013/0254589 A1* | 9/2013 | Sonobe | G06F 11/3055 |
| | | | 714/6.1 |
| 2017/0220506 A1* | 8/2017 | Brown | G06F 13/4068 |
| 2020/0104021 A1* | 4/2020 | Bylenok | G06F 3/02 |

* cited by examiner

METHOD, ELECTRONIC DEVICE AND COMPUTER PROGRAM PRODUCT FOR DATA PROCESSING

CROSS-REFERENCE TO RELATED APPLICATION

This application claims priority to Chinese Patent Application No. CN201911349473.1, on file at the China National Intellectual Property Administration (CNIPA), having a filing date of Dec. 24, 2019, and having "METHOD, ELECTRONIC DEVICE AND COMPUTER PROGRAM PRODUCT FOR DATA PROCESSING" as a title, the contents and teachings of which are herein incorporated by reference in their entirety.

FIELD

Embodiments of the present disclosure generally relate to the field of data processing, and more specifically, to a method, electronic device and computer program product for data processing.

BACKGROUND

With the development of data storage technology, various data storage devices have been able to provide users with increasingly better data storage performance. Currently, disk array technology is a data storage technology providing high reliability. A disk array is a group of disks consisting of a plurality of independent disks. For example, the disk array can be a redundant array of independent disks (RAID) or a group of disks with other suitable structures/forms. The different configurations of a disk array are called RAID levels, such as RAID 5, RAID 6, and RAID 10.

If a disk in the disk array fails, other disks in the disk array can be used to reconstruct the data in the failed disk, thereby improving the reliability of data storage. However, during the data reconstruction process, if the disk participating in the reconstruction is moved or removed due to a user's misoperation, the data reconstruction will fail, and even the data in the disk array will be unavailable.

SUMMARY

Embodiments of the present disclosure provide a method, electronic device and computer program product for data processing.

According to a first aspect of the present disclosure, there is provided a method for data processing. The method includes: determining, from a disk array, a target disk used for data reconstruction of the disk array; and sending, to an indicating apparatus associated with the target disk, an indication that the target disk is used for the data reconstruction.

According to a second aspect of the present disclosure, there is provided an electronic device. The electronic device includes: a processor; and a memory storing computer program instructions, and the processor running the computer program instructions in the memory to control the electronic device to perform actions including: determining, from a disk array, a target disk used for data reconstruction of the disk array; and sending, to an indicating apparatus associated with the target disk, an indication that the target disk is used for the data reconstruction.

According to a third aspect of the present disclosure, there is provided a computer program product tangibly being stored on a non-volatile computer-readable medium and including machine-executable instructions that, when executed by a device, cause the device to perform the method of the first aspect of the present disclosure.

It is to be understood that the invention is not intended to identify key or important features of embodiments of the present disclosure and not to limit the scope of the present disclosure. Other features of the present disclosure will be readily understood by the following description.

BRIEF DESCRIPTION OF THE DRAWINGS

Through the following detailed description with reference to the accompanying drawings, the above and other objectives, features, and advantages of embodiments of the present disclosure will become more understandable. Several embodiments of the present disclosure will be illustrated by way of example, but with no limitation, in the drawings in which.

DETAILED DESCRIPTION OF EMBODIMENTS

Figure 1:
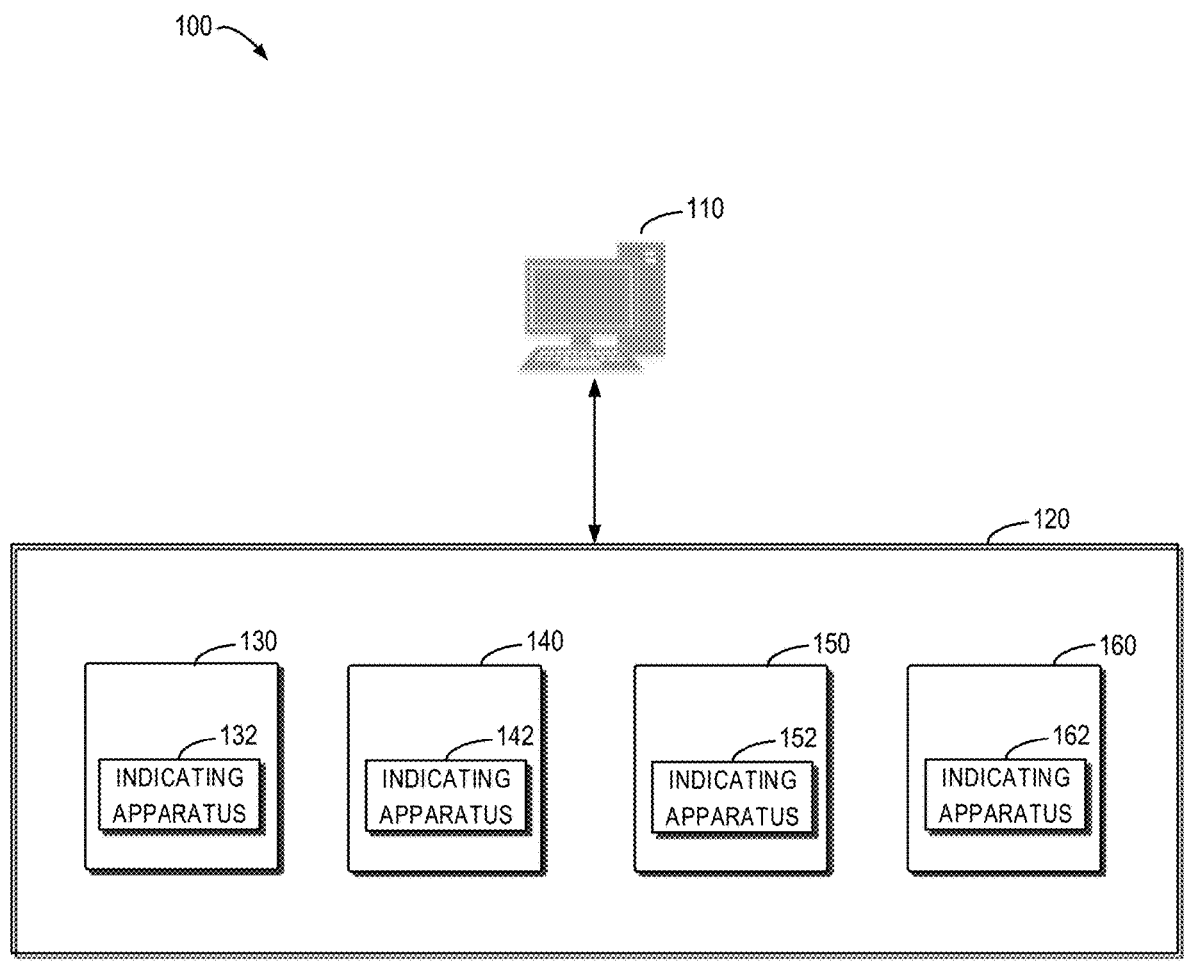
FIG. 1 illustrates a schematic diagram of an example environment 100 for data processing in accordance with embodiments of the present disclosure.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

The conception of the present disclosure will now be described with reference to various example embodiments illustrated in the drawings. It should be appreciated that description of those embodiments is merely to enable those skilled in the art to better understand and further implement example embodiments disclosed herein and is not intended for limiting the scope disclosed herein in any manner. It should be noted that similar or same reference symbols are employed in the drawings and refer to the same or similar elements. Those skilled in the art will appreciate that alternative embodiments of the structure and/or method described herein may be employed without departing from the principles and conception of the present disclosure.

In the context of the present disclosure, the term "includes" and its variants are to be read as open-ended terms that mean "includes, but is not limited to." The term "based on" is to be read as "based at least in part on." The term "one embodiment" is to be read as "at least one embodiment." The term "a further embodiment" is to be read as "at least a further embodiment." Other terms, which may occur but are not mentioned here, should not be interpreted or defined in a way that contradicts the concepts on which the embodiments of the present disclosure are based unless indicated otherwise.

As mentioned above, in a disk array with multiple disks, if a disk in the disk array fails, parity technique can be used to reconstruct the data in the failed disk by using other disks in the disk array. However, during the data reconstruction process, the disks participating in the data reconstruction cannot be removed from the disk array. If the disk participating in the reconstruction is removed from the disk array due to a user's misoperation, the data reconstruction will fail, and even the data in the disk array will be unavailable, resulting in huge losses to the user.

In order to solve the above problems and/or other potential problems, embodiments of the present disclosure propose a solution for data processing. This solution can determine, from a disk array, a target disk used for data reconstruction of the disk array. The solution can send, to an indicating apparatus associated with the target disk, an indication that the target disk is used for the data reconstruction. In this way, the solution can indicate to the user that target disks are being used for data reconstruction to remind the user that these target disks cannot be moved or removed.

Basic principles and implementations of the present disclosure will be explained below with reference to the drawings. It should be understood that the example embodiments are provided here to merely enable those skilled in the art to better understand and further implement embodiments of the present disclosure, rather than limiting the scope of the present disclosure in any manner.

FIG. 1 illustrates a schematic diagram of an example environment 100 for data processing in accordance with embodiments of the present disclosure. As shown in FIG. 1, the environment 100 includes an electronic device 110 and a disk array 120. The electronic device 110 may be a computer, a server, or any other device that can be used for data processing. Although one electronic device 110 is shown in the environment 100 of FIG. 1, it should be understood that this is only for the purpose of example, without suggesting any limitation to the scope of the present disclosure. In some embodiments, different numbers and/or other devices with different functions may also be included.

The disk array 120 includes a plurality of disks 130, 140, 150, and 160. Although four disks are shown in FIG. 1, it should be understood that this is only for the purpose of example, without suggesting any limitation to the scope of the present disclosure. In some embodiments, the disk array 120 may include any number of disks. The levels of the disk array 120 include, but are not limited to, RAID 5, RAID 6, RAID 10, and the like. The type of the disk may include, but is not limited to, a magnetic disk, an optical disk, a hard disk, a solid state disk, a cache, and the like.

As shown in FIG. 1, the disks 130, 140, 150, and 160 in the disk array 120 may have associated indicating apparatuses 132, 142, 152, and 162, respectively. The indicating apparatuses 132, 142, 152, and 162 are respectively used to indicate that the states of the disks 130, 140, 150, and 160 are normal, faulty, and data reconstruction in progress. For example, when one of the disks in the disk array 120 fails, the other disks in the disk array 120 may use parity technique to reconstruct the data of the failed disk. The electronic device 110 may determine a disk used for data reconstruction in the disk array 120 as a target disk. The electronic device 110 may send, to the indicating apparatus associated with the target disk, an indication that the target disk is used for the data reconstruction. The indicating apparatus associated with the target disk may perform a first operation to indicate that the target disk is used for data reconstruction. In this way, when the user sees the indication sent from the indicating apparatus, the user can determine that the target disk is performing data reconstruction so that operations such as moving or removing the target disk are not performed.

It should be understood that the indicating apparatuses 132, 142, 152, and 162 may be devices for indicating different operation states, such as lamps (e.g., light emitting diode (LED)), display screens (e.g., liquid crystal display (LCD)), or any device capable of sending a similar indication to the user. The electronic device 110 may further include a processor and a memory. In some embodiments, the memory may store computer programs, and the instructions of which can be executed by the processor to control the operation of the electronic device. It should be understood that the electronic device 110 may also include some other modules (or components) and/or devices not shown in FIG. 1, such as a communication module, an input-output device, and so on.

Figure 2:
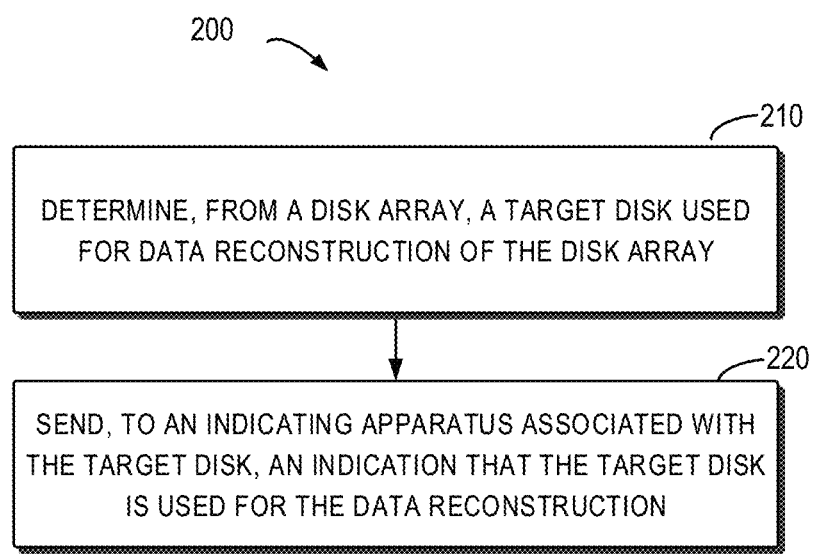
FIG. 2 illustrates a flowchart of a method 200 for data processing in accordance with embodiments of the present disclosure.

FIG. 2 illustrates a flowchart of a method 200 for data processing in accordance with embodiments of the present disclosure. It should be understood that at least a part of the method 200 may be performed by the electronic device 110 described above with reference to FIG. 1. The method 200 may also include blocks not shown and/or the shown blocks may be omitted. The scope of the present disclosure is not limited in this regard.

At block 210, the electronic device 110 may determine, from the disk array 120, a target disk used for data reconstruction. In some embodiments, the electronic device 110 may obtain state identifiers of the disks 130, 140, 150, and 160, and the state identifiers may indicate operation states of the disks 130, 140, 150, and 160, such as normal operation, failure, or performing data reconstruction, etc. The electronic device 110 may determine which disks in the disk array 120 are performing data reconstruction based on these state indicators. In some alternative embodiments, the electronic device 110 may designate other disks in the disk array 120 as target disks for data reconstruction after determining that a certain disk in the disk array 120 failed.

At block 220, the electronic device 110 may send, to the indicating apparatuses 142, 152, and 162 associated with the target disks 140, 150, and 160, indications that the target disks 140, 150, and 160 are used for data reconstruction to remind the user target disks 140, 150, and 160 are being used for data reconstruction.

In some embodiments, the indicating apparatus 142 of the disk 140 is turned off when data reconstruction is not performed. When the disk 140 performs data reconstruction, the electronic device 110 may send an indication to the indicating apparatus 142 to turn on the indicating device 142, thereby indicating that the disk 140 is performing data reconstruction.

In some alternative embodiments, the indicating apparatus 142 of the disk 140 may be turned off or turned on when data reconstruction is not performed. When the disk 140 performs data reconstruction, the electronic device 110 may send an indication to the indicating apparatus 142 to alternately turn it on and off at a predetermined frequency. In this way, the indicating apparatus 142 indicates the disk 140 is performing data reconstruction by flashing.

Alternatively, in other embodiments, the indicating apparatus 142 of the disk 140 may be turned off when data reconstruction is not performed. When the disk 140 performs data reconstruction, the electronic device 110 may send an indication to the indicating apparatus 142 to turn it on and switch its colors at a predetermined frequency. In this way, the indication device 142 indicates that the disk 140 is performing data reconstruction by means of color switching.

In this way, the user can determine that the target disk is in the data reconstruction state according to the indication of the indicating apparatus, so as to avoid data reconstruction failure caused by a user moving or removing the target disk.

Figure 3:
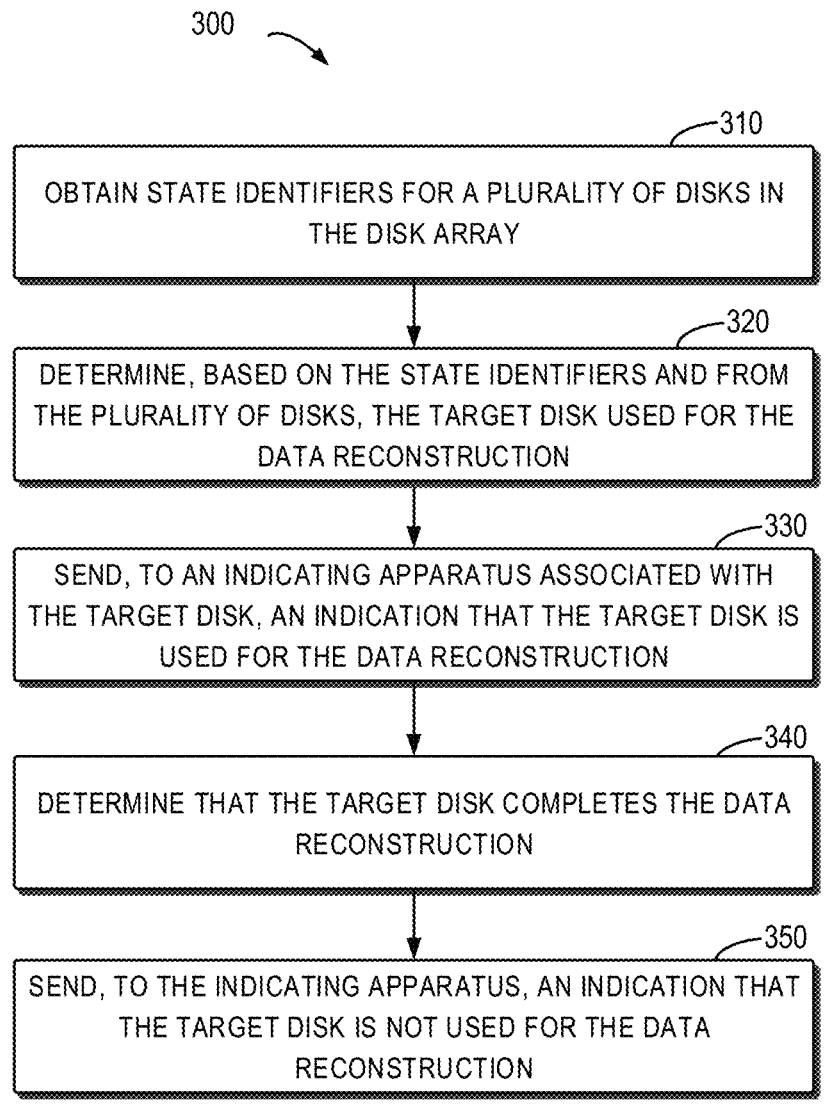
FIG. 3 illustrates a flowchart of a method 300 for data processing in accordance with other embodiments of the present disclosure.

FIG. 3 illustrates a flowchart of a method 300 for data processing in accordance with other embodiments of the present disclosure. It should be understood that the method 300 is an implementation of the method 200 and at least a part of the method 300 may be performed by the electronic device 110 described above with reference to FIG. 1. The method 300 may also include blocks not shown and/or the blocks may be omitted. The scope of the present disclosure is not limited in this regard.

At block 310, the electronic device 110 may obtain state identifiers of a plurality of disks in the disk array 120. In some embodiments, the disks 130, 140, 150, and 160 in the disk array 120 may have an indicator indicating the operating state of the disk, respectively. In this manner, the electronic device 110 can easily determine the states of the disks in the disk array 120.

At block 320, the electronic device 110 may determine a target disk used for data reconstruction based on the state identifier. In some embodiments, if the state identifiers associated with the disks 140, 150, and 160 indicate that the disks 140, 150, and 160 are performing data reconstruction operations, the electronic device 110 may determine that the disks 140, 150, and 160 are target disks for data reconstruction. In some alternative embodiments, if the disk 130 in the disk array 120 fails, the electronic device 110 may designate other disks 140, 150, and 160 in the disk array 120 as target disks for data reconstruction. For example, the electronic device 110 may indicate the disks 140, 150, and 160 to reconstruct data of the failed disk 130 in the backup disk (e.g., the backup disk may be one of the disks 140, 150, and 160, or any suitable additional disk) and set state identifiers of the disks 140, 150, and 160 to indicate that the disks 140, 150, and 160 are performing data reconstruction operations after the disks 140, 150, and 160 start performing data reconstruction. In this manner, the electronic device 110 can quickly determine which disks in the disk array are used for data reconstruction.

At block 330, the electronic device 110 may send an indication to the indicating apparatus such that the indicating apparatus indicates that the associated target disk is used for data reconstruction. For example, after determining that the disks 140, 150, and 160 are target disks for data reconstruction, the electronic device 110 may send indications to the indicating apparatuses 142, 152, and 162, so that the indicating apparatuses 142, 152, and 162 indicate that the target disks 140, 150 and 160 are used for data reconstruction. In this way, the user can know that the target disk is in a data reconstruction state according to the indication of the indicating apparatus.

In some embodiments, the state of the indicating apparatuses 142, 152, and 162 may change from an off state (for example, a non-light state) to an on state (for example, a light state) to indicate that the target disks 140, 150, and 160 are used for data reconstruction. In other embodiments, the indicating apparatuses 142, 152, and 162 may be alternately turned on and off (e.g., flash) at a predetermined frequency to indicate that the target disks 140, 150, and 160 are used for data reconstruction. For example, the indicating apparatuses 142, 152, and 162 may perform operations such as flash at 1 Hz or any other suitable frequency. In still other embodiments, the indicating apparatuses 142, 152, and 162 may be turned on and switching colors at a predetermined frequency indicate that the target disks 140, 150, and 160 are used for data reconstruction. For example, the indicating apparatuses 142, 152, and 162 may switch between different colors, such as red and yellow, at 1 Hz or any other suitable frequency. In this way, the user can be reminded to avoid moving or removing the target disk performing data reconstruction.

At block 340, the electronic device 110 may determine whether the target disk completes data reconstruction. Still taking the failure of the disk 130 as an example, for example, after the target disks 140, 150, and 160 complete the data reconstruction, they can send to the electronic device 110 an indication that the data reconstruction is completed. After receiving the indication that the data reconstruction is completed, the electronic device 110 may determine that the target disks 140, 150, and 160 complete the data reconstruction. In this manner, the electronic device 110 can quickly determine a target disk which completes data reconstruction.

At block 350, the electronic device 110 may send to the indicating apparatus an indication that the target disk is not used for data reconstruction. Still taking the failure of the disk 130 as an example, for example, after the target disks 140, 150, and 160 complete data reconstruction, the electronic device 110 may send, to the indicating apparatuses 142, 152, and 162 associated with the target disk 140, 150, and 160, indications that disks 140, 150, and 160 are not used for data reconstruction, such that the indicating apparatuses 142, 152, and 162 indicate that the target disks 140, 150, and 160 are not used for data reconstruction. In some embodiments, the state of the indicating apparatuses 142, 152, and 162 may change from the on state to the off state to indicate that the target disks 140, 150, and 160 are not used for data reconstruction. In another embodiment, the indicating apparatuses 142, 152, and 162 may keep displaying a certain color, such as blue, to indicate that the target disks 140, 150, and 160 are not used for data reconstruction. In this way, the user can quickly determine that the target disk completes data reconstruction according to the indication of the indicating apparatus.

In some embodiments, after determining that the target disk completes data reconstruction, the electronic device 110 may set the state identifier of the target disk to indicate that the target disk operates normally. For example, after determining that the target disks 140, 150, and 160 complete data reconstruction, the electronic device 110 sets the state identifiers of the target disks 140, 150, and 160 to indicate that the target disks 140, 150, and 160 operate normally. In this manner, the electronic device 110 may set an associated state identifier according to the current state of the target disk so that the electronic device 110 performs subsequent operations.

In some embodiments, the indicating apparatus 132 associated with the failed disk 130 may indicate that the disk 130 fails. For example, the indicating apparatus 132 may display a different color or image from the indicating apparatuses 142, 152, and 162 to indicate that the disk 130 fails. In this way, the user can intuitively know that the target disk fails according to the indication of the indicating apparatus.

Figure 4:
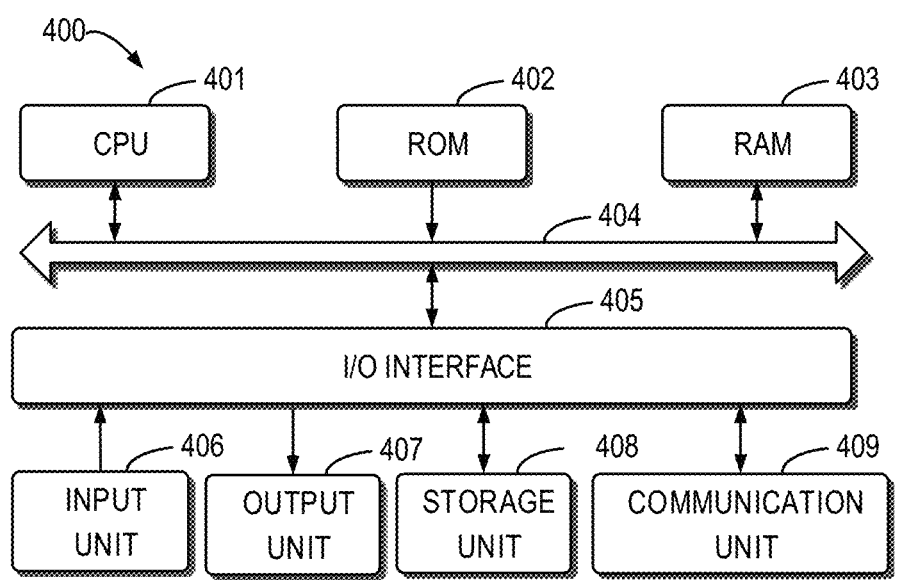
FIG. 4 illustrates a schematic block diagram of a device 400 for implementing embodiments of the present disclosure.

FIG. 4 illustrates a schematic block diagram of a device 400 for implementing embodiments of the present disclosure. The device 400 may be the electronic device 110 described above with reference to FIG. 1. As shown, the device 400 includes a central processing unit (CPU) 401, which can execute various suitable actions and processing based on the computer program instructions stored in the read-only memory (ROM) 402 or computer program instructions loaded in the random-access memory (RAM) 403 from a storage unit 408. The RAM 403 can also store all kinds of programs and data required by the operations of the device 400. CPU 401, ROM 402 and RAM 403 are connected to each other via a bus 404. The input/output (I/O) interface 405 is also connected to the bus 404.

A plurality of components in the device 400 is connected to the I/O interface 405, including: an input unit 406, such as keyboard, mouse and the like; an output unit 407, e.g., various kinds of display and loudspeakers etc.; a storage unit 408, such as magnetic disk and optical disk etc.; and a communication unit 409, such as network card, modem, wireless transceiver and the like. The communication unit 409 allows the device 400 to exchange information/data with other devices via the computer network, such as Internet, and/or various telecommunication networks.

Various methods and processes described above may be performed by the processing unit 401. For example, in some embodiments, the methods 200 and 300 can be implemented as a computer software program tangibly included in the machine-readable medium, e.g., storage unit 408. In some embodiments, the computer program can be partially or fully loaded and/or mounted to the device 400 via ROM 402 and/or communication unit 409. When the computer program is loaded to RAM 403 and executed by the CPU 401, one or more steps of the above described methods can be implemented.

In some embodiments, the methods and processes described above may be implemented as a computer program product. The computer program product can include a computer-readable storage medium, on which the computer-readable program instructions for executing various aspects of the present disclosure are loaded.

The computer-readable storage medium can be a tangible apparatus that maintains and stores instructions utilized by the instruction executing apparatuses. The computer-readable storage medium can be, but is not limited to, electrical storage device, magnetic storage device, optical storage device, electromagnetic storage device, semiconductor storage device or any appropriate combinations of the above. More concrete examples of the computer-readable storage medium (non-exhaustive list) include: portable computer disk, hard disk, random-access memory (RAM), read-only memory (ROM), erasable programmable read-only memory (EPROM or flash), static random-access memory (SRAM), portable compact disk read-only memory (CD-ROM), digital versatile disk (DVD), memory stick, floppy disk, mechanical coding devices, punched card stored with instructions thereon, or a projection in a slot, and any appropriate combinations of the above. The computer-readable storage medium utilized here is not interpreted as transient signals per se, such as radio waves or freely propagated electromagnetic waves, electromagnetic waves propagated via waveguide or other transmission media (such as optical pulses via fiber-optic cables), or electric signals propagated via electric wires.

The described computer-readable program instruction can be downloaded from the computer-readable storage medium to each computing/processing device, or to an external computer or external storage via Internet, local area network, wide area network and/or wireless network. The network can include copper-transmitted cable, optical fiber transmission, wireless transmission, router, firewall, switch, network gate computer and/or edge server. The network adapter card or network interface in each computing/processing device receives computer-readable program instructions from the network and forwards the computer-readable program instructions for storage in the computer-readable storage medium of each computing/processing device.

The computer program instructions for executing operations of the present disclosure can be assembly instructions, instructions of instruction set architecture (ISA), machine instructions, machine-related instructions, microcode, firmware instructions, state setting data, or source codes or target codes written in any combination of one or more programming languages, wherein the programming languages consist of object-oriented programming languages, e.g., Smalltalk, C++ and so on, and traditional procedural programming languages, such as "C" language or similar programming languages. The computer-readable program instructions can be implemented fully on the user computer, partially on the user computer, as an independent software package, partially on the user computer and partially on the remote computer, or completely on the remote computer or server. In the case where a remote computer is involved, the remote computer can be connected to the user computer via any type of networks, including local area network (LAN) and wide area network (WAN), or to the external computer (e.g., connected via Internet using the Internet service provider). In some embodiments, state information of the computer-readable program instructions is used to customize an electronic circuit, e.g., programmable logic circuit, field programmable gate array (FPGA) or programmable logic array (PLA). The electronic circuit can execute computer-readable program instructions to implement various aspects of the present disclosure.

The computer-readable program instructions can be provided to the processing unit of a general-purpose computer, dedicated computer or other programmable data processing apparatuses to manufacture a machine, such that the instructions, when executed by the processing unit of the computer or other programmable data processing apparatuses, generate an apparatus for implementing functions/actions stipulated in one or more blocks in the flow chart and/or block diagram. The computer-readable program instructions can also be stored in the computer-readable storage medium and cause the computer, programmable data processing apparatus and/or other devices to work in a particular manner, such that the computer-readable medium stored with instructions contains an article of manufacture, including instructions for implementing various aspects of the functions/actions stipulated in one or more blocks of the flow chart and/or block diagram.

The computer-readable program instructions can also be loaded into computer, other programmable data processing apparatuses or other devices, so as to execute a series of operation steps on the computer, other programmable data processing apparatuses or other devices to generate a computer-implemented procedure. Therefore, the instructions executed on the computer, other programmable data processing apparatuses or other devices implement functions/actions stipulated in one or more blocks of the flow chart and/or block diagram.

The flow chart and block diagram in the drawings illustrate system architecture, functions and operations that may be implemented by system, method and computer program product according to multiple implementations of the present disclosure. In this regard, each block in the flow chart or block diagram can represent a module, a part of program segment or code, wherein the module and the part of program segment or code include one or more executable instructions for performing stipulated logic functions. In some alternative implementations, it should be noted that the functions indicated in the block can also take place in an order different from the one indicated in the drawings. For example, two successive blocks can be in fact executed in parallel or sometimes in a reverse order dependent on the involved functions. It should also be noted that each block in the block diagram and/or flow chart and combinations of the blocks in the block diagram and/or flow chart can be implemented by a hardware-based system exclusive for executing stipulated functions or actions, or by a combination of dedicated hardware and computer instructions.

Various implementations of the present disclosure have been described above and the above description is only by way of example rather than exhaustive and is not limited to the implementations of the present disclosure. Many modifications and alterations, without deviating from the scope and spirit of the explained various implementations, are obvious for those skilled in the art. The selection of terms in the text aims to best explain principles and actual applications of each implementation and technical improvements made in the market by each embodiment, or enable others of ordinary skill in the art to understand implementations of the present disclosure.

We claim:

1. A method for data processing, comprising:
    determining, from a disk array, a target disk used for data reconstruction of the disk array;
    sending, to an indicating apparatus associated with the target disk, an indication that the target disk is used for the data reconstruction,
    wherein sending the indication comprises sending the indication to the indicating apparatus, so that the indicating apparatus performs a first operation to indicate that the target disk is used for the data reconstruction,
    wherein the first operation comprises turning on the indicating apparatus and switching colors at a predetermined frequency, and
    wherein switching colors at the predetermined frequency includes switching, by the indicating apparatus, between a first color and a second color at the predetermined frequency, the second color being different from the first color; and
    sending, to the indicating apparatus associated with the target disk, a second indication that the target disk is not used for the data reconstruction,
    wherein sending the second indication comprises sending the second indication to the indicating apparatus so that the indicating apparatus performs a second operation to indicate that the target disk is not used for the data reconstruction, and
    wherein the second operation comprises turning on the indicating apparatus and keeping displaying a third color different from each of the first color and the second color.

2. The method of claim 1, wherein determining the target disk comprises:
    obtaining state identifiers for a plurality of disks in the disk array, the state identifiers indicating operation states of the plurality of disks; and
    determining, based on the state identifiers and from the plurality of disks, the target disk used for the data reconstruction, the state identifier of the target disk indicating that the target disk is performing a data reconstruction operation.

3. The method of claim 1, further comprising:
    determining that the target disk completes the data reconstruction.

4. The method of claim 3, further comprising:
    setting a state identifier of the target disk to indicate that the target disk operates normally.

5. The method of claim 1, wherein the indicating apparatus comprises at least one of a lamp and a display screen.

6. An electronic device, comprising:
    a processor; and
    a memory storing computer program instructions, and the processor running the computer program instructions in the memory to control the electronic device to perform actions comprising:
    determining, from a disk array, a target disk used for data reconstruction of the disk array;
    sending, to an indicating apparatus associated with the target disk, an indication that the target disk is used for the data reconstruction,
    wherein sending the indication comprises sending the indication to the indicating apparatus, so that the indicating apparatus performs a first operation to indicate that the target disk is used for the data reconstruction,
    wherein the first operation comprises turning on the indicating apparatus and switching colors at a predetermined frequency, and
    wherein switching colors at the predetermined frequency includes switching, by the indicating apparatus, between a first color and a second color at the predetermined frequency, the second color being different from the first color; and
    sending, to the indicating apparatus associated with the target disk, a second indication that the target disk is not used for the data reconstruction,
    wherein sending the second indication comprises sending the second indication to the indicating apparatus, so that the indicating apparatus performs a second operation to indicate that the target disk is not used for the data reconstruction, and
    wherein the second operation comprises turning on the indicating apparatus and keeping displaying a third color different from each of the first color and the second color.

7. The electronic device of claim 6, wherein determining the target disk comprises:
    obtaining state identifiers for a plurality of disks in the disk array, the state identifiers indicating operation states of the plurality of disks; and
    determining, based on the state identifiers and from the plurality of disks, the target disk used for the data reconstruction, the state identifier of the target disk indicating that the target disk is performing a data reconstruction operation.

8. The electronic device of claim 6, the actions further comprising:
    determining that the target disk completes the data reconstruction.

9. The electronic device of claim 8, the actions further comprising:

setting a state identifier of the target disk to indicate that the target disk operates normally.

10. The electronic device of claim 6, wherein the indicating apparatus comprises at least one of a lamp and a display screen.

11. A computer program product having a non-transitory computer readable medium which stores a set of instructions to perform data processing; the set of instructions, when carried out by computerized circuitry, causing the computerized circuitry to perform a method of:

determining, from a disk array, a target disk used for data reconstruction of the disk array;

sending, to an indicating apparatus associated with the target disk, an indication that the target disk is used for the data reconstruction, wherein sending the indication comprises sending the indication to the indicating apparatus, so that the indicating apparatus performs a first operation to indicate that the target disk is used for the data reconstruction, wherein the first operation comprises turning on the indicating apparatus and switching colors at a predetermined frequency, and wherein switching colors at the predetermined frequency includes switching, by the indicating apparatus, between a first color and a second color at the predetermined frequency, the second color being different from the first color; and sending, to the indicating apparatus associated with the target disk, a second indication that the target disk is not used for the data reconstruction, wherein sending the second indication comprises sending the second indication to the indicating apparatus, so that the indicating apparatus performs a second operation to indicate that the target disk is not used for the data reconstruction, and wherein the second operation comprises turning on the indicating apparatus and keeping displaying a third color different from each of the first color and the second color.

\* \* \* \* \*